US010154176B1

(12) United States Patent
Hicks et al.

(10) Patent No.: US 10,154,176 B1
(45) Date of Patent: Dec. 11, 2018

(54) CALIBRATING DEPTH CAMERAS USING NATURAL OBJECTS WITH EXPECTED SHAPES

(71) Applicant: INTEL CORPORATION, Santa Clara, CA (US)

(72) Inventors: Richmond F. Hicks, Aloha, OR (US); Avinash Kumar, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 10 days.

(21) Appl. No.: 15/608,200

(22) Filed: May 30, 2017

(51) Int. Cl.
*H04N 5/222* (2006.01)
*G06K 9/32* (2006.01)
*H04N 13/128* (2018.01)
*G01B 11/22* (2006.01)
*G06F 17/30* (2006.01)

(52) U.S. Cl.
CPC ......... *H04N 5/2226* (2013.01); *G06K 9/3241* (2013.01); *H04N 13/128* (2018.05); *G01B 11/22* (2013.01); *G06F 17/30244* (2013.01); *G06K 2209/21* (2013.01)

(58) Field of Classification Search
USPC ........................................................ 396/104
See application file for complete search history.

(56) References Cited

U.S. PATENT DOCUMENTS

| | | | | |
|---|---|---|---|---|
| 8,704,875 | B2 * | 4/2014 | Cheng | H04N 13/0011 345/419 |
| 9,536,312 | B2 * | 1/2017 | Zhang | G06K 9/2036 |
| 9,808,549 | B2 * | 11/2017 | Welch | A61L 2/28 |
| 2012/0287233 | A1 * | 11/2012 | Wang | H04N 13/128 348/42 |
| 2013/0321589 | A1 * | 12/2013 | Kirk | G06T 15/04 348/48 |
| 2015/0009277 | A1 * | 1/2015 | Kuster | G06T 15/205 348/14.07 |
| 2015/0271567 | A1 * | 9/2015 | Michot | H04N 21/4312 348/47 |
| 2015/0332464 | A1 * | 11/2015 | O'Keefe | G06K 9/00201 348/47 |
| 2016/0184469 | A1 * | 6/2016 | Welch | A61B 5/002 348/143 |

\* cited by examiner

*Primary Examiner* — Clayton E Laballe
*Assistant Examiner* — Warren K Fenwick
(74) *Attorney, Agent, or Firm* — International IP Law Group, P.L.L.C.

(57) ABSTRACT

An example apparatus for calibrating depth cameras includes an image receiver to receive an image from a depth camera. The apparatus also includes an object detector to detect a natural object with an expected shape in the image. The apparatus further includes a parameter adjuster to adjust a parameter of the depth camera to reduce a detected difference between the expected shape and a measured characteristic of the natural object.

25 Claims, 7 Drawing Sheets

200

400

500

CALIBRATING DEPTH CAMERAS USING NATURAL OBJECTS WITH EXPECTED SHAPES

BACKGROUND

Calibration of depth cameras that use triangulation may be performed using special test charts. In some examples, features of a test chart may be known in advance. The distance to the chart and its orientation relative to one of the stereo cameras can be derived based solely on that camera. For example, the size of the squares may be proportional to the distance to the target. In addition, the warpage or distortion of the squares may be proportional to the angle between the reference camera and the target. Once the relative position of the test chart is known, errors in the depth may be measured using the stereo pair and camera parameters including pointing direction can be modified to reduce the resulting errors in depth output.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
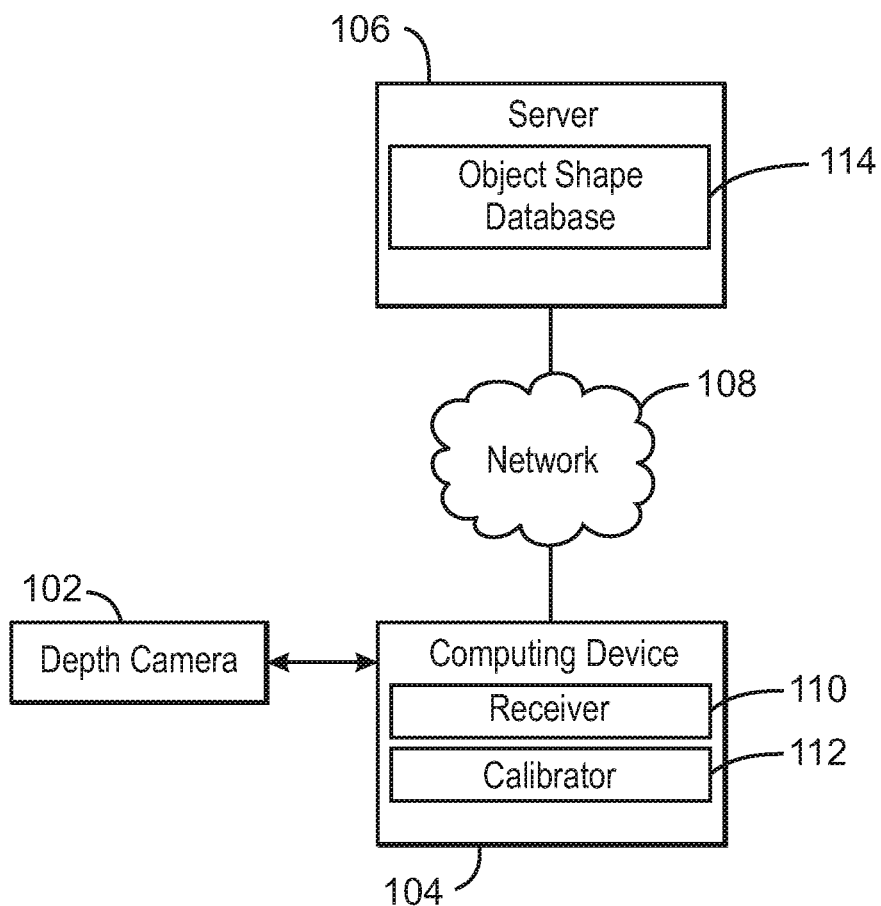
FIG. 1 is a block diagram illustrating an example system for calibrating depth cameras using natural objects with expected shapes.

As discussed above, depth camera systems that rely on triangulation may be calibrated and performance tested at the time of manufacturing. Such depth cameras may include stereo cameras. In some examples, performance tests may employ special reference targets that are compared against a reference model to determine if the camera is operating correctly. Because the distance to the target and its shape are known, a system may be able to determine misalignment and other non-ideal characteristics of the cameras and modify the depth calculation parameters to accommodate these errors. The accuracy of the depth camera may thus be improved. However, while such techniques are effective, the dependence on a-priori knowledge of the target limits the usage of this approach to manufacturing facilities. For example, the use of a special test chart may be inconvenient for a user to repeatedly use for calibration. Moreover, due to thermal and mechanical stresses, the physical alignment of the camera components can change over time. This change in alignment may reduce the accuracy of the depth camera after an initial factory calibration.

The present disclosure relates generally to techniques for calibrating depth cameras. Specifically, the techniques described herein include an apparatus, method, and system for calibrating depth cameras using natural objects with expected shapes. For example, the expected shapes may be any geometric shapes associated with the natural objects. As used herein, a natural object refers to any detected object in an image and excludes calibration targets made specifically for the purpose of calibration. An example apparatus includes an image receiver to receive an image from a depth camera. The apparatus also includes an object detector to detect a natural object with an expected shape in the image. For example, the natural object may be an object detected as having an expected shape such as a rectangular, square, octangular, or any other shape. The apparatus further includes an edge segmenter to segment edges of the expected shape of the natural object. The apparatus includes a pose estimator to estimate a pose based on the expected shape. The apparatus also further includes a gradient generator to generate a disparity-based depth gradient and a homography-based depth gradient. The apparatus further includes a gradient comparer to detect a difference between the disparity-based depth gradient and the homography-based depth gradient exceeds a predetermined threshold. The apparatus further includes a parameter adjuster to adjust a parameter to reduce the difference between the disparity-based depth gradient and the homography-based depth gradient below the predetermined threshold.

The techniques described herein thus enable checking the accuracy of the camera calibration post capture, and in some cases correcting any calibration errors without the intervention of the user. In addition, the independence of the techniques described herein on specific scenes, or user actions, implies that the calibration errors may be corrected using post processing that can be executed either locally or remotely depending on the needs of the application. For example, calibration errors may be corrected using a cloud based service that can be updated. Also, the techniques described herein may use natural objects of any expected geometry. For example, stop signs are expected to be octagonal and yield signs are expected to be triangular. In addition, the techniques described herein use relative distances, and do not use the absolute distance from the camera to the objects. Therefore, there is no need to place an object at a predetermined distance from the camera or to know the absolute distance from the camera to the object. Thus, the techniques described herein may be applied in a variety of environments. Moreover, the techniques described herein may also be applied to calibrate a variety of depth cameras, including stereo cameras, structured light cameras, and coded light cameras.

FIG. 1 is a block diagram illustrating an example system for calibrating depth cameras using natural objects with expected shapes. The example system is referred to generally by the reference number 100 and can be implemented in the computing device 600 below in FIG. 6 using the method 500 of FIG. 5 below.

The example system 100 includes a depth camera 102, a computing device 104 coupled to the depth camera 102, and a server 106, communicatively coupled to the computing device 104 via a network 108. The computing device 104 includes a receiver 110 and a calibrator 112. The server 106 includes an object shape database 114.

As shown in FIG. 1, the computing device 104 may receive depth images from the depth camera 102. For example, the depth camera 102 may be a stereo camera and the depth images may be sets of images with a predetermined displacement of view that are captured by the depth camera.

The diagram of FIG. 1 is not intended to indicate that the example system 100 is to include all of the components shown in FIG. 1. Rather, the example system 100 can be implemented using fewer or additional components not illustrated in FIG. 1 (e.g., additional depth cameras, computing devices, servers, networks, components, etc.).

Figure 2:
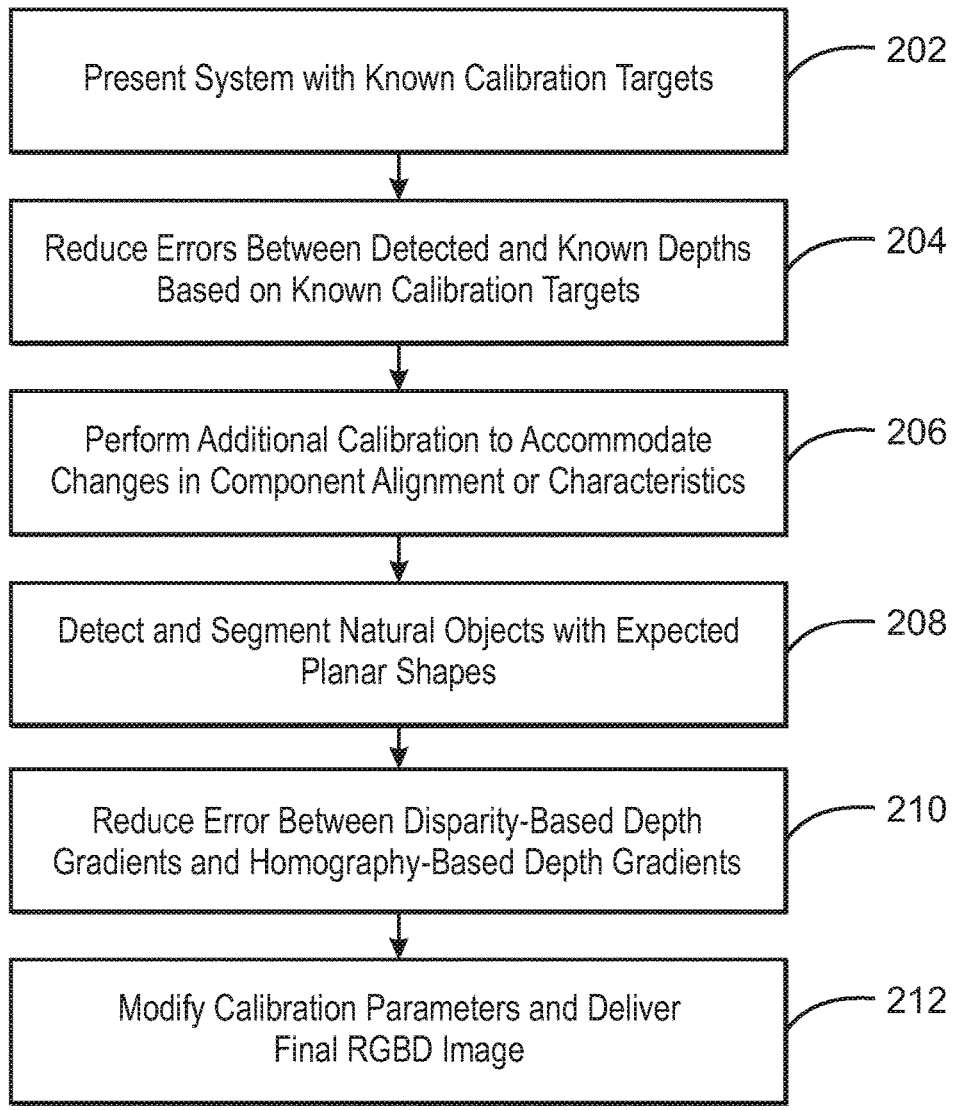
FIG. 2 is a process flow diagram illustrating an example process for calibrating depth cameras.

FIG. 2 is a process flow diagram illustrating an example process for calibrating depth cameras. The example process is generally referred to by the reference number 200 and can be partially implemented using the techniques described herein. For example, blocks 208 and 210 may be performed using the calibrator 112 of computing device 104 above or the computing device 600 below.

At block 202, a system is presented with known calibration targets. For example, a depth camera may be factory calibrated after being manufactured. The known calibration targets may be, for example, calibration signs with predetermined patterns that may have been specifically designed for calibration purposes.

At block 204, the system reduces errors between detected depth and known depths based on the known calibration targets. The detected depth may be a distance computed based on a current estimate of calibration parameters. For example, one or more parameters of the depth camera may be adjusted at a factory based on detected depth to the calibration chart and the known depth of the calibration targets. In particular, the known calibration targets may have been placed a predetermined distance away from the depth camera in a calibration process at a factory after being manufactured. As mentioned above, the known calibration targets may be special test charts. In some examples, because the features of the test chart may be known, the depth of the chart and its orientation relative to one of the stereo cameras can be derived based solely on that camera. The calculations used to determine the distance and orientation of the chart may use the fact that the size of the squares may be proportional to the distance to the target, and the perspective warpage or distortion of the squares may be proportional to the angle between the reference camera and the target. Once the relative position of the test chart is known, errors in the depth measured using the stereo pair can be identified and camera parameters including pointing direction can be modified to reduce the resulting errors in depth output.

At block 206, additional calibration may be performed to accommodate changes in component alignment or characteristics. After block 204 above, the physical alignment of one or more depth camera components may drift over time. The drift of the components may be due to thermal and mechanical stresses. For example, the system may be dropped after the system leaves the factory. The system identifies corresponding points in the two cameras and reduces disparities not aligned to an epipolar axis of the depth camera. The corresponding points may be image points in a stereo pair which are projections of the same 3D point. For example, disparity perpendicular to the epipolar axis may be due to vertical misalignment of one of stereo cameras, errors in the magnification, rotation of the camera or a host of other defects in the alignment of the cameras introduced after factory calibration. Thus, vertical misalignment between the corresponding points, also known as rectification error, may be reduced using any suitable technique. If correctly calibrated, there may be no disparity except along the epipolar axis which may be due to the depth. Thus, the remaining disparity can then be periodically addressed via the blocks 208-212 below.

At block 208, a processor detects and segments natural objects with expected planar shapes. For example, the processor may receive an image with natural objects having expected shapes corresponding to any geometric shape. For example, the expected shapes may be rectangular, circular, triangular, octangular, etc. In some examples, the natural objects may be pool tables, stop signs, yield signs, etc. In some examples, natural objects with expected shapes may be obtained from a database of objects with corresponding expected shapes. In some examples, the processor may segment edges of each expected shape for each natural object with an expected shape. In some examples, the processor may select a natural object with an expected shape for calibration and segment the edges of the expected shape of the selected object.

At block 210, the processor reduces error between disparity-based depth gradients and homography-based depth gradients. For example, the gradients may be the derivative of the depth values. For example, the processor may adjust one or more parameters to reduce error between the disparity-based depth gradients and the homography-based depth gradients. In some examples, disparity-based gradients may be calculated based on a disparity along the segmented edges calculated between two stereo images. In some examples, homography-based gradients may be calculated using multi-view geometry constraints to calculate a percentage change in depth gradient along the segmented edges of the natural object.

At block 212, the processor modifies calibration parameters and delivers a final RGBD image. For example, the calibration parameters may be iteratively optimized to minimize any differences between the depth gradients defined by the disparity and the homography.

This process flow diagram is not intended to indicate that the blocks of the example process 200 are to be executed in any particular order, or that all of the blocks are to be included in every case. Further, any number of additional blocks not shown may be included within the example process 200, depending on the details of the specific implementation.

Figure 3:
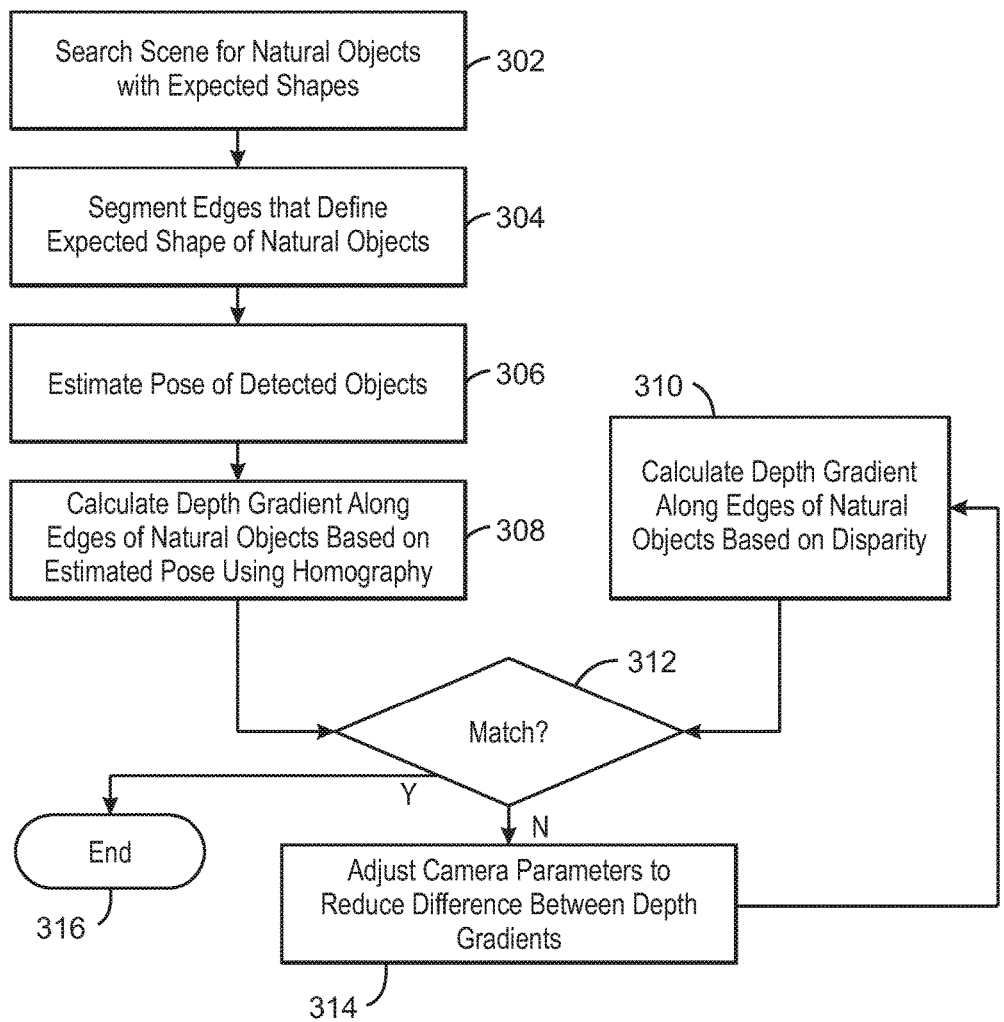
FIG. 3 is a detailed process flow diagram illustrating an example process for calibrating depth cameras using natural objects with expected shapes.

FIG. 3 is a detailed process flow diagram illustrating an example process for calibrating depth cameras using natural objects with expected shapes. The example process is generally referred to by the reference number 300 and can be implemented in the computing device 600 below. For example, the process 300 can be implemented using the calibrator 112 of the computing device 104 of FIG. 1, the calibrator 628 of the computing device 600 of FIG. 6 below, or the computer readable media 700 of FIG. 7 below.

At block 302, a processor can search a scene for natural objects with expected shapes. In some examples, the scene may be an image received including one or more natural objects with expected shapes. For example, the shapes may be rectangular, triangular, octangular, etc. In some examples, natural objects with expected shapes can be detected using template matching. For example, an object shape database may include templates for any number natural objects with expected shapes. The processor may compare the templates to detected objects in order to detect natural objects with an expected shape. In some examples, natural objects with expected shapes can be detected using CNN based segmentation network trained using deep learning algorithms. For example, the CNN networks may be trained in advance to detect natural objects with expected shapes.

At block 304, the processor segments edges that define the expected shapes of the natural objects with expected shapes. For example, the processor may segment edges using canny edge detection, or any other suitable technique.

At block 306, the processor estimates a pose of the natural objects. For example, the processor may estimate the pose based on a comparison of the observed shape of the natural object with the segmented edges in the captured imaged and the known geometry of the natural object. In some examples, the processor may also compare the pose with expectations for the selected object to avoid the use of poses based on false detections. For example, a table should be parallel to the floor and this comparison may be made to ensure that a trapezoidal table is disregarded rather than being used as a rectangular object in block 308 below.

At block 308, the processor calculates a depth gradient along the edges of the natural objects based on the estimated pose using homography. For example, the homography-based depth gradient may be calculated using multi-view geometry constraint of perspective projection. In some examples, no attempt may be made to calculate the actual distance. For example, the focus may be solely on the depth gradient, which may be the derivative of the depth values. For example, the depth gradient may be expressed as a percentage change in depth along the tracked edges.

At block 310, the processor calculates a depth gradient along the edges of the natural objects based on disparity. For example, the processor may calculate the disparity-based depth gradient using any suitable stereo algorithm, such as that implemented on Intel's RealSense™ cameras, to determine disparity along the segmented edges. In some examples, the processor may then convert the disparity to depth based on current camera calibration parameters.

At decision diamond 312, the processor determines whether the homography-based depth gradient of block 308 matches the depth gradient of block 310. In some examples, if the difference between the homography-based depth gradient of block 308 and the depth gradient of block 310 is detected as exceeding a predetermined threshold, then the method may continue at block 314. In some examples, if the difference between the homography-based depth gradient of block 308 and the depth gradient of block 310 is detected as not exceeding a predetermined threshold, then the method may end at block 316.

At block 314, the processor adjusts one or more depth camera parameters to reduce the difference between the depth gradients. For example, the disparity-based depth gradients, rather than absolute values, may be compared to match the homography-based depth gradient predicted based on the pose. For example, a disparity-based depth may be consistently off by 10% relative to the homography-based depth, but the disparity-based gradient may match the homography-based gradient because the depth is consistently different. The depth gradients, or the derivative of the depth, may thus match between the two approaches, but the homography-base depth may be a different depth value than the disparity-based depth if the system guesses incorrectly at the size of the natural object. For example, a smaller than expected pool table may look to be farther away, but the derivative of the depth, or depth gradient, may be the same regardless of the size of the natural object. If the disparity-based gradient does not match the homography-based gradient, the camera calibration parameters can be adjusted to minimize the error. For example, one or more parameters corresponding to alignment of the stereo camera may be adjusted. In some examples, the processor may also perform a realism check to ensure the proposed calibration update is within expected values. For example, such a realism check may improve robustness to the presence of natural objects that are misidentified as including rectangular features, or other expected shapes. In some examples, a manual recalibration of the camera may be made based on displayed parameters to be adjusted.

At block 316, the process ends. In some examples, the depth camera may indicate that it has been calibrated and is ready to use.

This process flow diagram is not intended to indicate that the blocks of the example process 300 are to be executed in any particular order, or that all of the blocks are to be included in every case. Further, any number of additional blocks not shown may be included within the example process 300, depending on the details of the specific implementation.

Figure 4:
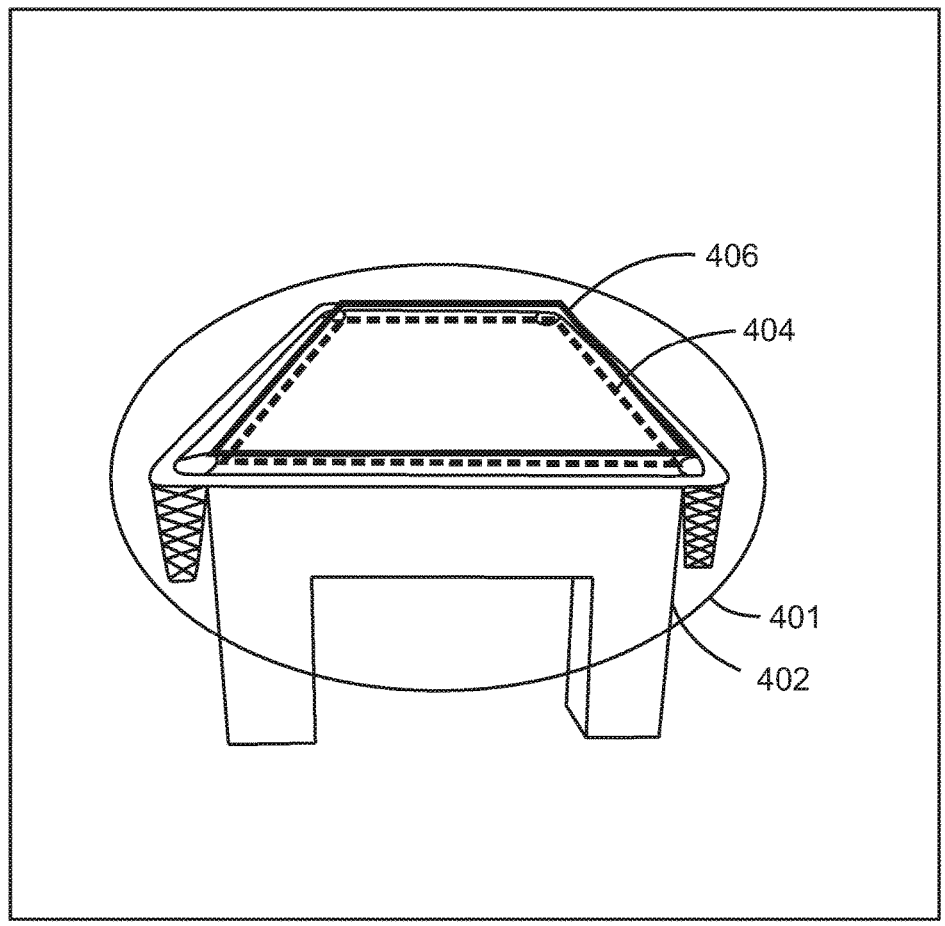
FIG. 4 is an image illustrating an example natural object used to calibrate depth a camera.

FIG. 4 is an image illustrating an example natural object used to calibrate a depth camera. The example image is referenced generally using the reference number 400 and may be received by the receiver 110, the image receiver 630, or the image receiver module 706, and be processed using, for example, the calibrator 112 of the computing device 104 of FIG. 1 above, the object detector 632 of the computing device 600 of FIG. 6 below, or the object detector module 708 of the computer readable media 700 of FIG. 7 below.

The image 400 of FIG. 4 includes a bounding circle 401 bounding a natural object 402. FIG. 4 also includes an edge quadrilateral 404 of the natural object defined by homography, and an edge quadrilateral 406 of the natural object defined by disparity.

As shown in FIG. 4, a natural object 402 may have been detected in a received image from a depth camera. For example, the natural object 402 shown in FIG. 4 is a pool table. In some examples, the natural object 402 may have an associated expected shape. For example, the pool table may have an expected rectangular shape. In some examples, the expected shape may be determined using an object shape database. For example, the shape of the pool table may be determined by detecting a pool table and looking up the expected shape of the detected pool table in the object shape database. The detected pool table natural object 402 may thus be identified as having an expected rectangular features. The rectangular features may then be segmented to define a resulting edge quadrilateral 404. The segmentation may be performed using canny edge detection, among other suitable techniques.

A pose may then be estimated based on the shape of the edge quadrilateral 404. In the example of FIG. 4, the parallel top and bottom edges along with the symmetry in the left and right edges of the edge quadrilateral 404 indicate the center of the natural object is aligned with horizontal axis of the camera. In addition, the slope of the left and right edges of the edge quadrilateral 404 indicates the camera is imaging the table from above. Since the resulting pose is reasonable given the target, the algorithm concludes the pose is accurate and proceeds.

In some examples, a homography-based depth gradient can be predicted based solely on the pose. For example, no attempt need be made to detect smaller, closer natural objects 402 as opposed to detecting larger further away natural objects 402. In both cases the depth change as a percentage will be the same.

The left and right edges of the shape offer corresponding features in the left and right stereo images and can be used to estimate the disparity. Based on a baseline, and combination of extrinsic and intrinsic calibration parameters, this can be converted to depth values, from which the disparity-based depth gradient can be extracted. For example, the baseline may be the distance between the two cameras in a stereo depth camera.

In some examples, any mismatches between the depth gradients can be used to correct the calibration. For example, if the gradient is greater for the disparity-based depth gradient, then the cameras may be bent away from each other relative to the stored calibration. In some examples, the updates to the calibration values may be subjected to limits based on expected system drift to ensure they are not corrupted by incorrectly identified natural objects that are not the expected shape. For example, trapezoidal tables may lead to incorrect expected shapes due to tables being associated with rectangular shapes. Thus, the edge quadrilaterals 404 and 406 of the object 402 may be calculated based on homography and disparity, respectively.

The diagram of FIG. 4 is not intended to indicate that the example image 400 of a natural object 402 is to include all of the features shown in FIG. 4. Rather, the example image 400 can include fewer or additional features not illustrated in FIG. 4 (e.g., additional natural objects, edges, image features, etc.).

Figure 5:
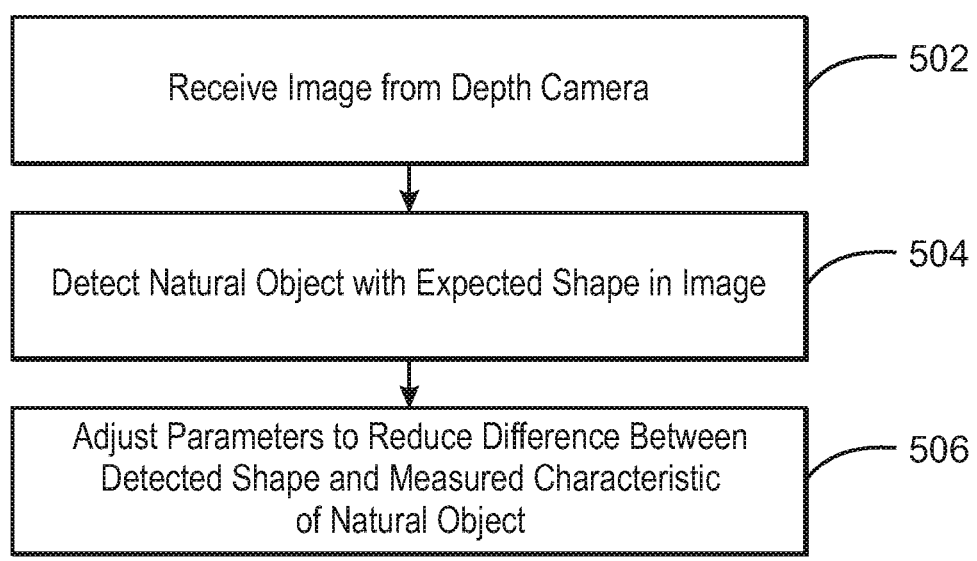
FIG. 5 is a flow chart illustrating a method for calibrating depth cameras using natural objects with expected shapes.

FIG. 5 is a flow chart illustrating a method for calibrating depth cameras using natural objects with expected shapes. The example method is generally referred to by the reference number 500 and can be implemented in the computing device 104 of FIG. 1 above, the processor 602 of the computing device 600 of FIG. 6 below, or the computer readable media 700 of FIG. 7 below.

At block 502, a processor receives an image from a depth camera. In some examples, the image may be one of a pair of stereo images.

At block 504, the processor detects a natural object with an expected shape in the image. For example, the expected shape may be a polygonal shape. In some examples, the processor may detect the natural object with an expected shape based on a template. For example, the template may be received from an object shape database. In some examples, the processor may use a neural network that may have been trained in advance to detect the natural object. In some examples, the processor may also qualify natural objects by comparing a pose of the natural object to an expected pose for the natural object and disregarding natural objects with unnatural poses. For example, a trapezoidal table, classified as a rectangular shape may result in a pose that was not parallel to the floor and therefore not appropriate to a table. If the processor determines the pose to be unreasonable, the processor may disregard the object as a source for calibration improvement.

At block 506, the processor adjusts a parameter to reduce a difference between the detected shape and a measured characteristic of the natural object. In some examples, the processor may adjust the parameter to reduce a difference between a disparity-based depth gradient and a homography-based depth gradient below a predetermined threshold. For example, the processor can segment edges of the expected shape of the natural object. In some example, after template matching in block 504, a band on image region can be selected at the boundary on the natural object in the image. A canny based edge detection can be performed on the band. In some examples, the processor may also apply a constraint that the detected edge is straight. For example, applying constraints to the detected edges may make the canny-based edge detection more robust. In some examples, the processor can estimate a pose based on the expected shape. For example, the processor may estimate the pose by comparing the expected shape of the natural object with the segmented edges. In some examples, the processor can generate the disparity-based depth gradient and the homography-based depth gradient. For example, the processor may generate the disparity-based depth gradient by calculating a disparity along the segmented edges between two stereo images including the image and converting the disparity to depth based on calibration parameters of the depth camera. Further, the processor may generate the homography-based depth gradient using multi-view geometry to calculate a percentage change in depth along the segmented edges. The processor may then detect a difference between the disparity-based depth gradient and the homography-based depth gradient and determine if the difference exceeds the predetermined threshold. The processor can then modify one or more calibration parameters of the depth camera based on the adjusted parameter. In some examples, the processor can limit modifications of one or more depth camera parameters based on an expected system change. For example, modifications greater than a threshold adjustment may be prevented to avoid overcorrections due to incorrect natural object detections.

This process flow diagram is not intended to indicate that the blocks of the example process 500 are to be executed in any particular order, or that all of the blocks are to be included in every case. Further, any number of additional blocks not shown may be included within the example process 500, depending on the details of the specific implementation.

Figure 6:
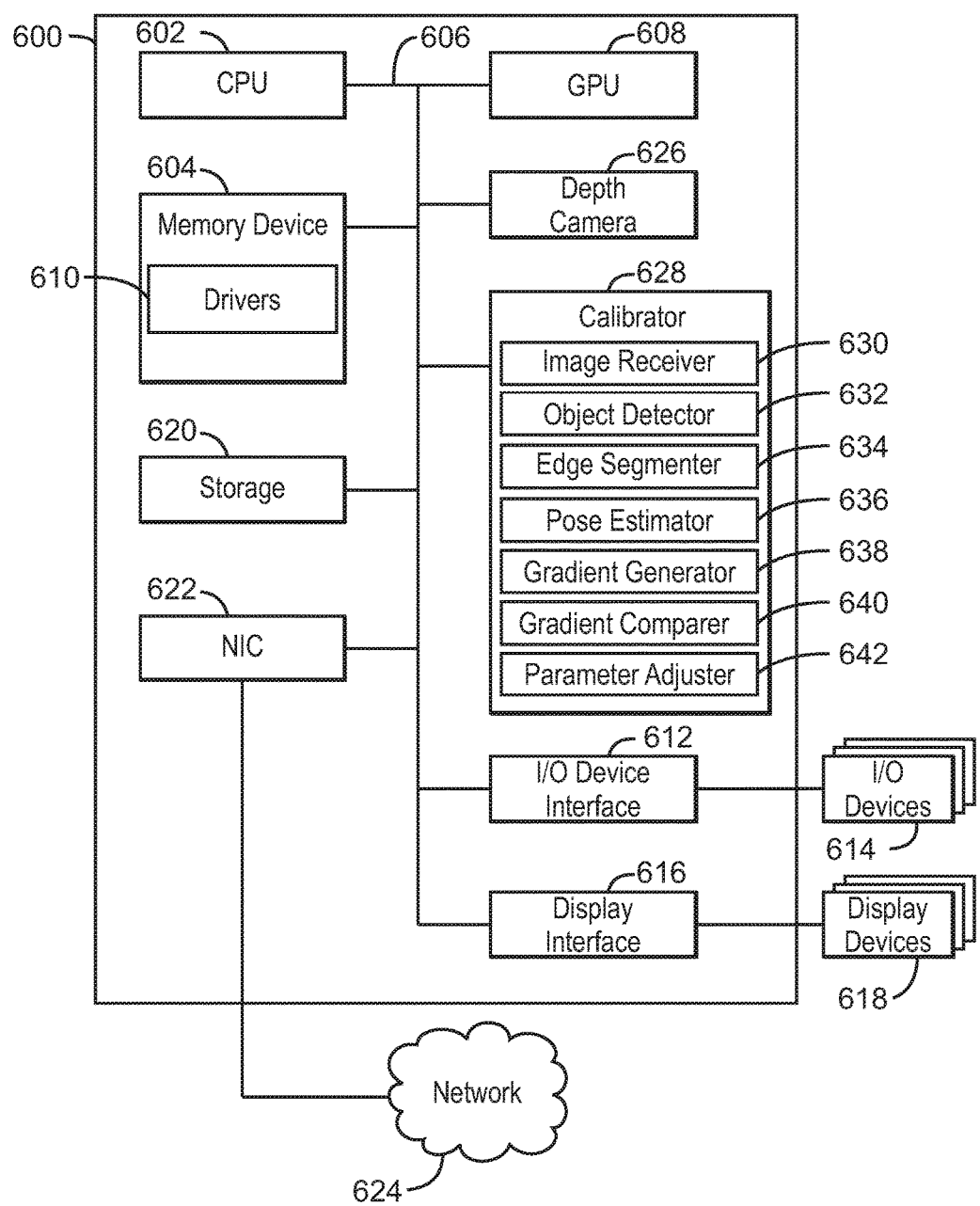
FIG. 6 is block diagram illustrating an example computing device that can calibrate depth cameras using natural objects with expected shapes.

Referring now to FIG. 6, a block diagram is shown illustrating an example computing device that can calibrate depth cameras using natural objects with expected shapes. The computing device 600 may be, for example, a laptop computer, desktop computer, tablet computer, mobile device, or wearable device, among others. In some examples, the computing device 600 may be a smart camera or a digital security surveillance camera. In some examples, the computing device 600 may be a node based in cloud. For example, the computing device 600 may provide depth camera calibration as a cloud-based service. The computing device 600 may include a central processing unit (CPU) 602 that is configured to execute stored instructions, as well as a memory device 604 that stores instructions that are executable by the CPU 602. The CPU 602 may be coupled to the memory device 604 by a bus 606. Additionally, the CPU 602 can be a single core processor, a multi-core processor, a computing cluster, or any number of other configurations. Furthermore, the computing device 600 may include more than one CPU 602. In some examples, the CPU 602 may be a system-on-chip (SoC) with a multi-core processor architecture. In some examples, the CPU 602 can be a specialized digital signal processor (DSP) used for image processing. The memory device 604 can include random access memory (RAM), read only memory (ROM), flash memory, or any other suitable memory systems. For example, the memory device 604 may include dynamic random access memory (DRAM).

The memory device 604 can include random access memory (RAM), read only memory (ROM), flash memory, or any other suitable memory systems. For example, the memory device 604 may include dynamic random access memory (DRAM). The memory device 604 may include device drivers 610 that are configured to execute the instructions for device discovery. The device drivers 610 may be software, an application program, application code, or the like.

The computing device 600 may also include a graphics processing unit (GPU) 608. As shown, the CPU 602 may be coupled through the bus 606 to the GPU 608. The GPU 608 may be configured to perform any number of graphics operations within the computing device 600. For example, the GPU 608 may be configured to render or manipulate graphics images, graphics frames, videos, or the like, to be displayed to a user of the computing device 600.

The memory device 604 can include random access memory (RAM), read only memory (ROM), flash memory, or any other suitable memory systems. For example, the memory device 604 may include dynamic random access memory (DRAM). The memory device 604 may include device drivers 610 that are configured to execute the instructions for generating virtual input devices. The device drivers 610 may be software, an application program, application code, or the like.

The CPU 602 may also be connected through the bus 606 to an input/output (I/O) device interface 612 configured to connect the computing device 600 to one or more I/O devices 614. The I/O devices 614 may include, for example, a keyboard and a pointing device, wherein the pointing device may include a touchpad or a touchscreen, among others. The I/O devices 614 may be built-in components of the computing device 600, or may be devices that are externally connected to the computing device 600. In some examples, the memory 604 may be communicatively coupled to I/O devices 614 through direct memory access (DMA).

The CPU 602 may also be linked through the bus 606 to a display interface 616 configured to connect the computing device 600 to a display device 618. The display device 618 may include a display screen that is a built-in component of the computing device 600. The display device 618 may also include a computer monitor, television, or projector, among others, that is internal to or externally connected to the computing device 600.

The computing device 600 also includes a storage device 620. The storage device 620 is a physical memory such as a hard drive, an optical drive, a thumbdrive, an array of drives, a solid-state drive, or any combinations thereof. The storage device 620 may also include remote storage drives.

The computing device 600 may also include a network interface controller (NIC) 622. The NIC 622 may be configured to connect the computing device 600 through the bus 606 to a network 624. The network 624 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The computing device 600 further includes a depth camera 626. For example, the depth camera may include one or more depth sensors. In some example, the depth camera may include a processor to generate depth information. For example, the depth camera 626 may include functionality such as RealSense™ technology.

The computing device 600 further includes a calibrator 628. For example, the calibrator 628 can be used to calibrate the depth camera 626. The calibrator 628 can include an image receiver 630, an object detector 632, an edge segmenter 634, a pose estimator 636, a gradient generator 638, a gradient comparer 640, and a parameter adjuster 642. In some examples, each of the components 630-642 of the calibrator 628 may be a microcontroller, embedded processor, or software module. The image receiver 630 can receive an image from a depth camera. In some examples, the image may have one or more natural objects with expected shapes. For example, the expected shapes may be polygonal shapes. The object detector 632 can detect a natural object with an expected shape in the image. For example, the object detector 632 can detect a natural object with an expected shape based on data from an object shape database. For example, the object detector 632 can detect the expected shape based on a template. In some examples, the expected shape may be a planar geometric shape to be used to compute a homography. The edge segmenter 634 can segment edges of the expected shape of the natural object. For example, the edge segmenter 634 can perform segmentation using canny edge detection. The pose estimator 636 can estimate a pose of the natural object based on the expected shape. The gradient generator 638 can generate a disparity-based depth gradient and a homography-based depth gradient. For example, the gradient generator 638 can generate the disparity-based depth gradient based on a disparity along the segmented edges calculated between two stereo images. For example, gradient generator 638 can generate the homography-based depth gradient using multi-view geometric projections to calculate a percentage change in depth along the segmented edges. The gradient comparer 640 can detect a difference between the disparity-based depth gradient and the homography-based depth gradient exceeds a predetermined threshold. The parameter adjuster 642 can adjust a parameter of the depth camera to reduce a detected difference between the expected shape and a measured characteristic of the natural object. For example, the parameter adjuster 642 can adjust a parameter to reduce the difference between the disparity-based depth gradient and the homography-based depth gradient below the predetermined threshold. In some examples, the parameter adjuster 642 can limit modifications of one or more depth camera parameters based on expected system changes. For example, modifications that would result in changes exceeding a threshold corresponding to the expected system change may be limited based on the threshold.

The block diagram of FIG. 6 is not intended to indicate that the computing device 600 is to include all of the components shown in FIG. 6. Rather, the computing device 600 can include fewer or additional components not illustrated in FIG. 6, such as additional buffers, additional processors, and the like. The computing device 600 may include any number of additional components not shown in FIG. 6, depending on the details of the specific implementation. Furthermore, any of the functionalities of the CPU 602 may be partially, or entirely, implemented in hardware and/or in a processor. For example, the functionality of the speech recognizer 628 may be implemented with an application specific integrated circuit, in logic implemented in a processor, in logic implemented in a specialized graphics processing unit such as the GPU 608, or in any other device.

Figure 7:
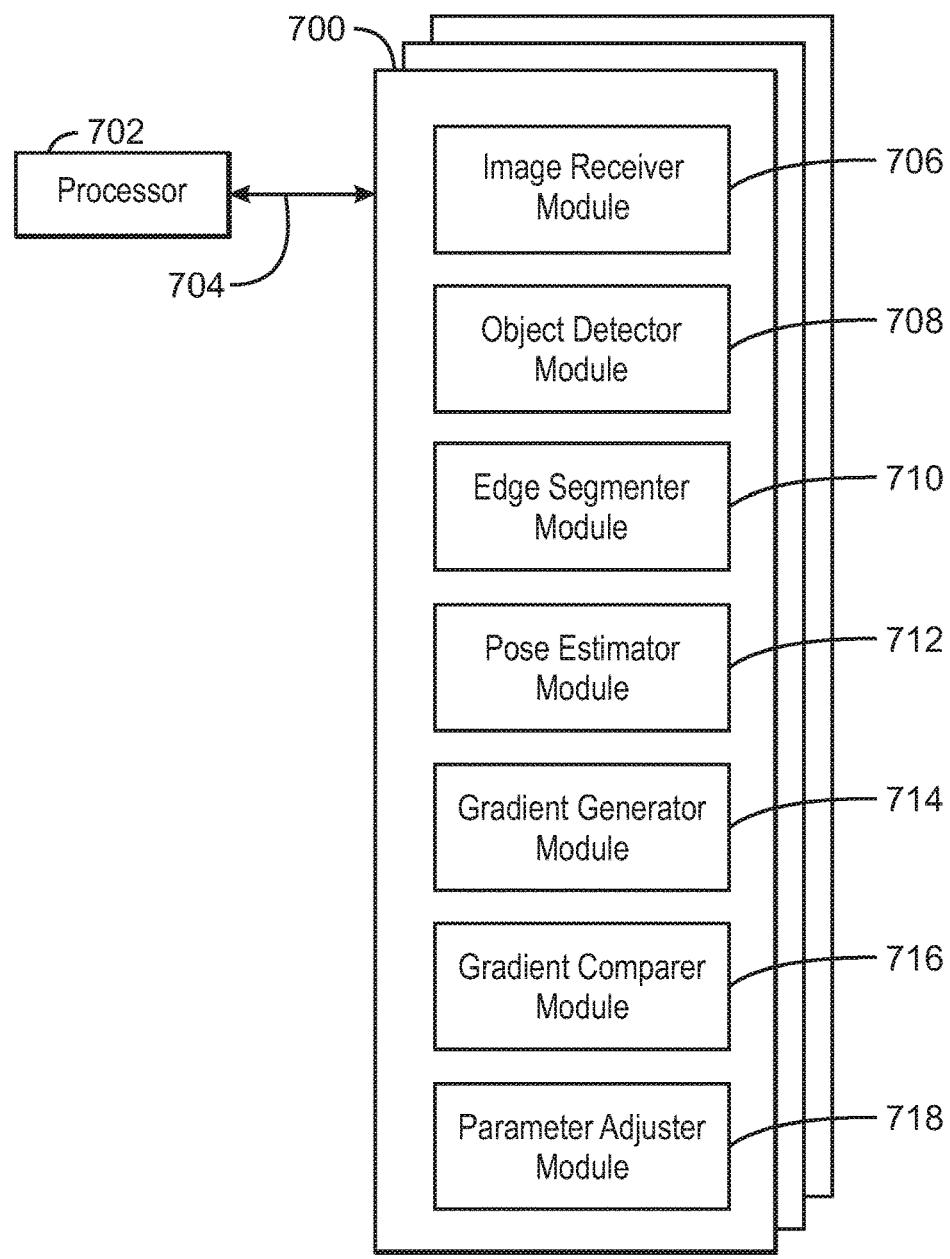
FIG. 7 is a block diagram showing computer readable media that store code for calibrating depth cameras using natural objects with expected shapes.

FIG. 7 is a block diagram showing computer readable media 700 that store code for calibrating depth cameras using natural objects with expected shapes. The computer readable media 700 may be accessed by a processor 702 over a computer bus 704. Furthermore, the computer readable medium 700 may include code configured to direct the processor 702 to perform the methods described herein. In some embodiments, the computer readable media 700 may be non-transitory computer readable media. In some examples, the computer readable media 700 may be storage media.

The various software components discussed herein may be stored on one or more computer readable media 700, as indicated in FIG. 7. For example, an image receiver module

706 may be configured to receive an image from a depth camera. An object detector module 708 may be configured to detect a natural object with an expected shape in the image. In some examples, the expected shape may be a planar geometric shape. For example, the expected shapes may be polygonal shapes. In some examples, the object detector module 708 may be configured to detect the natural object based on an object template. In some examples, the qualify the natural object by comparing a pose of the natural object to an expected pose for the natural object and disregarding natural objects with unnatural poses. For example, windows and doors should be orthogonal to the floor. If the system analyzes a trapezoidal window expecting it to be rectangular, the resulting pose may not be orthogonal to the floor or parallel to the wall. In these cases, the object detector module 708 can reject this particular natural object as a means of improving calibration. An edge segmenter module 710 may be configured to segment edges of the expected shape of the natural object. For example, the segmenter module 710 may be configured to segment edges of the expected shape of the natural object using canny edge detection. In some examples, the segment module 710 can apply a constraint that the detected edge of the natural object is straight. In some examples, the segmenter module 710 can select a band on an image region at the boundary of the natural object and perform edge detection on the band. A pose estimator module 712 may be configured to estimate a pose of the natural object based on the expected shape. For example, the pose estimator module 712 may be configured to estimate the pose of the natural object based on a comparison of the expected shape with the segmented edges. A gradient generator module 714 may be configured to generate a disparity-based depth gradient and a homography-based depth gradient. For example, the gradient generator module 714 may be configured to generate the disparity-based depth gradient based on a disparity along the segmented edges calculated between two stereo images. For example, the gradient generator 714 may be configured to generate the homography-based gradient using multi-view geometric projections to calculate percentage change in depth along the tracked edges. For example, the gradient generator 714 may be configured to compute a homograph based on the expected shape. A gradient comparer module 716 may be configured to detect a difference between the disparity-based depth gradient and the homography-based depth gradient exceeds a predetermined threshold. A parameter adjuster module 718 may be configured to adjust a parameter to reduce the difference between the disparity-based depth gradient and the homography-based depth gradient below the predetermined threshold. In some examples, the parameter adjuster module 718 may be configured to limit modification of one or more depth camera parameters based on an expected system change.

The block diagram of FIG. 7 is not intended to indicate that the computer readable media 700 is to include all of the components shown in FIG. 7. Further, the computer readable media 700 may include any number of additional components not shown in FIG. 7, depending on the details of the specific implementation.

Examples

Example 1 is an apparatus for calibrating depth cameras. The apparatus includes an image receiver to receive an image from a depth camera. The apparatus also includes an object detector to detect a natural object with an expected shape in the image. The apparatus further includes a parameter adjuster to adjust a parameter of the depth camera to reduce a detected difference between the expected shape and a measured characteristic of the natural object.

Example 2 includes the apparatus of example 1, including or excluding optional features. In this example, the apparatus includes a pose estimator to estimate a pose of the natural object based on the expected shape; a gradient generator to generate a disparity-based depth gradient and a homography-based depth gradient; and a gradient comparer to detect a difference between the disparity-based depth gradient and the homography-based depth gradient exceeds a predetermined threshold, wherein the parameter adjuster is to adjust a parameter to reduce the difference between the disparity-based depth gradient and the homography-based depth gradient below the predetermined threshold.

Example 3 includes the apparatus of any one of examples 1 to 2, including or excluding optional features. In this example, the apparatus includes an edge segmenter to segment edges of the expected shape of the natural object.

Example 4 includes the apparatus of any one of examples 1 to 3, including or excluding optional features. In this example, the gradient generator is to generate the disparity-based depth gradient based on a disparity along the segmented edges calculated between two stereo images.

Example 5 includes the apparatus of any one of examples 1 to 4, including or excluding optional features. In this example, the gradient generator is to generate the homography-based depth gradient using multi-view geometric projections to calculate a percentage change in depth along the segmented edges.

Example 6 includes the apparatus of any one of examples 1 to 5, including or excluding optional features. In this example, the parameter adjuster is to limit modifications of one or more depth camera parameters based on expected system changes.

Example 7 includes the apparatus of any one of examples 1 to 6, including or excluding optional features. In this example, the expected shape includes a polygonal shape.

Example 8 includes the apparatus of any one of examples 1 to 7, including or excluding optional features. In this example, the expected shape includes a planar geometric shape to be used to compute a homography.

Example 9 includes the apparatus of any one of examples 1 to 8, including or excluding optional features. In this example, the parameter includes a parameter corresponding to alignment of the depth camera, wherein the depth camera includes a stereo camera.

Example 10 includes the apparatus of any one of examples 1 to 9, including or excluding optional features. In this example, the apparatus may be a node that provides a calibration service over a network.

Example 11 is a method for calibrating depth cameras. The method includes receiving, via a processor, an image from a depth camera. The method includes detecting, via the processor, a natural object with an expected shape in the image. The method includes adjusting, via the processor, a parameter to reduce the difference between the expected shape and a measured characteristic of the natural object.

Example 12 includes the method of example 11, including or excluding optional features. In this example, the method includes estimating, via the processor, a pose of the natural object based on the expected shape. The method includes generating, via the processor, a disparity-based depth gradient and a homography-based depth gradient. The method includes detecting, via the processor, a difference between the disparity-based depth gradient and the homography-based depth gradient exceeds a predetermined threshold.

Adjusting the parameter includes adjusting to reduce the difference between the disparity-based depth gradient and the homography-based depth gradient below the predetermined threshold.

Example 13 includes the method of any one of examples 11 to 12, including or excluding optional features. In this example, the method includes segmenting, via the processor, edges of the expected shape of the natural object, wherein generating the disparity-based depth gradient includes calculating a disparity along the segmented edges between two stereo images including the image and converting the disparity to depth based on calibration parameters of the depth camera.

Example 14 includes the method of any one of examples 11 to 13, including or excluding optional features. In this example, generating the homography-based depth gradient includes calculating a percentage change in depth along the segmented edges.

Example 15 includes the method of any one of examples 11 to 14, including or excluding optional features. In this example, the method includes limiting modification of the parameter based on an expected system change.

Example 16 includes the method of any one of examples 11 to 15, including or excluding optional features. In this example, the method includes qualifying, via the processor, the natural object by comparing a pose of the natural object to an expected pose for the natural object and disregarding natural objects with unnatural poses.

Example 17 includes the method of any one of examples 11 to 16, including or excluding optional features. In this example, the method includes applying, via the processor, a constraint that the detected edge of the natural object is straight.

Example 18 includes the method of any one of examples 11 to 17, including or excluding optional features. In this example, the method includes selecting a band on an image region at the boundary of the natural object and performing edge detection on the band.

Example 19 includes the method of any one of examples 11 to 18, including or excluding optional features. In this example, the method includes detecting, via the processor, the expected shape based on a template.

Example 20 includes the method of any one of examples 11 to 19, including or excluding optional features. In this example, the method includes computing a homograph based on the expected shape.

Example 21 is at least one computer readable medium for calibrating depth cameras having instructions stored therein that. The computer-readable medium includes instructions that direct the processor to receive an image from a depth camera; detect a natural object with an expected shape in the image; estimate a pose of the natural object based on the expected shape. The computer-readable medium includes instructions that direct the processor to generate a disparity-based depth gradient and a homography-based depth gradient. The computer-readable medium includes instructions that direct the processor to detect a difference between the disparity-based depth gradient and the homography-based depth gradient exceeds a predetermined threshold. The computer-readable medium includes instructions that direct the processor to adjust a parameter to reduce the difference between the disparity-based depth gradient and the homography-based depth gradient below the predetermined threshold.

Example 22 includes the computer-readable medium of example 21, including or excluding optional features. In this example, the computer-readable medium includes instructions to segment edges of the expected shape of the natural object and generate the disparity-based depth gradient based on a disparity along the segmented edges calculated between two stereo images.

Example 23 includes the computer-readable medium of any one of examples 21 to 22, including or excluding optional features. In this example, the computer-readable medium includes instructions to generate the homography-based depth gradient using multi-view geometric projections to calculate a percentage change in depth along the segmented edges.

Example 24 includes the computer-readable medium of any one of examples 21 to 23, including or excluding optional features. In this example, the computer-readable medium includes instructions to detect the natural object based on an object template.

Example 25 includes the computer-readable medium of any one of examples 21 to 24, including or excluding optional features. In this example, the computer-readable medium includes instructions to limit modification of one or more depth camera parameters based on an expected system change.

Example 26 includes the computer-readable medium of any one of examples 21 to 25, including or excluding optional features. In this example, the computer-readable medium includes instructions to qualify the natural object by comparing a pose of the natural object to an expected pose for the natural object and disregarding natural objects with unnatural poses.

Example 27 includes the computer-readable medium of any one of examples 21 to 26, including or excluding optional features. In this example, the computer-readable medium includes instructions to apply a constraint that the detected edge of the natural object is straight.

Example 28 includes the computer-readable medium of any one of examples 21 to 27, including or excluding optional features. In this example, the computer-readable medium includes instructions to select a band on an image region at the boundary of the natural object and perform edge detection on the band.

Example 29 includes the computer-readable medium of any one of examples 21 to 28, including or excluding optional features. In this example, the computer-readable medium includes instructions to detect the expected shape based on a template.

Example 30 includes the computer-readable medium of any one of examples 21 to 29, including or excluding optional features. In this example, the computer-readable medium includes instructions to compute a homograph based on the expected shape.

Example 31 is a system for calibrating depth cameras. The system includes an image receiver to receive an image from a depth camera. The system includes an object detector to detect a natural object with an expected shape in the image. The system includes a parameter adjuster to adjust a parameter of the depth camera to reduce a detected difference between the expected shape and a measured characteristic of the natural object.

Example 32 includes the system of example 31, including or excluding optional features. In this example, the system includes a pose estimator to estimate a pose of the natural object based on the expected shape. The system includes a gradient generator to generate a disparity-based depth gradient and a homography-based depth gradient. The system also further includes a gradient comparer to detect a difference between the disparity-based depth gradient and the homography-based depth gradient exceeds a predetermined threshold. The parameter adjuster is to adjust a parameter to reduce the difference between the disparity-based depth gradient and the homography-based depth gradient below the predetermined threshold.

Example 33 includes the system of any one of examples 31 to 32, including or excluding optional features. In this example, the system includes an edge segmenter to segment edges of the expected shape of the natural object.

Example 34 includes the system of any one of examples 31 to 33, including or excluding optional features. In this example, the gradient generator is to generate the disparity-based depth gradient based on a disparity along the segmented edges calculated between two stereo images.

Example 35 includes the system of any one of examples 31 to 34, including or excluding optional features. In this example, the gradient generator is to generate the homography-based depth gradient using multi-view geometric projections to calculate a percentage change in depth along the segmented edges.

Example 36 includes the system of any one of examples 31 to 35, including or excluding optional features. In this example, the parameter adjuster is to limit modifications of one or more depth camera parameters based on an expected system change.

Example 37 includes the system of any one of examples 31 to 36, including or excluding optional features. In this example, the expected shape includes a polygonal shape.

Example 38 includes the system of any one of examples 31 to 37, including or excluding optional features. In this example, the expected shape includes a planar geometric shape to be used to compute a homography.

Example 39 includes the system of any one of examples 31 to 38, including or excluding optional features. In this example, the parameter includes a parameter corresponding to alignment of the depth camera, wherein the depth camera includes a stereo camera.

Example 40 includes the system of any one of examples 31 to 39, including or excluding optional features. In this example, the system includes a node that provides a calibration service over a network.

Example 41 is a system for calibrating depth cameras. The system includes means for receiving an image from a depth camera. The system also includes means for detecting a natural object with an expected shape in the image. The system further includes and means for adjusting a parameter of the depth camera to reduce a detected difference between the expected shape and a measured characteristic of the natural object.

Example 42 includes the system of example 41, including or excluding optional features. In this example, the system includes means for estimating a pose of the natural object based on the expected shape. The system also includes means for generating a disparity-based depth gradient and a homography-based depth gradient. The system also further includes means for detecting a difference between the disparity-based depth gradient and the homography-based depth gradient exceeds a predetermined threshold. The means for adjusting the parameter is to adjust a parameter to reduce the difference between the disparity-based depth gradient and the homography-based depth gradient below the predetermined threshold.

Example 43 includes the system of any one of examples 41 to 42, including or excluding optional features. In this example, the system includes means for segmenting edges of the expected shape of the natural object.

Example 44 includes the system of any one of examples 41 to 43, including or excluding optional features. In this example, the means for generating the gradients is to generate the disparity-based depth gradient based on a disparity along the segmented edges calculated between two stereo images.

Example 45 includes the system of any one of examples 41 to 44, including or excluding optional features. In this example, the means for generating the gradients is to generate the homography-based depth gradient using multi-view geometric projections to calculate a percentage change in depth along the segmented edges.

Example 46 includes the system of any one of examples 41 to 45, including or excluding optional features. In this example, the means for adjusting the parameter is to limit modifications of one or more depth camera parameters based on an expected system change.

Example 47 includes the system of any one of examples 41 to 46, including or excluding optional features. In this example, the expected shape includes a polygonal shape.

Example 48 includes the system of any one of examples 41 to 47, including or excluding optional features. In this example, the expected shape includes a planar geometric shape to be used to compute a homography.

Example 49 includes the system of any one of examples 41 to 48, including or excluding optional features. In this example, the parameter includes a parameter corresponding to alignment of the depth camera, wherein the depth camera includes a stereo camera.

Example 50 includes the system of any one of examples 41 to 49, including or excluding optional features. In this example, the system includes a node that is to provide a calibration service over a network.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for calibrating depth cameras, comprising:
an image receiver to receive an image from a depth camera;
an object detector to detect a natural object with an expected shape in the image; and
a parameter adjuster to adjust a parameter of the depth camera to reduce a detected difference between the expected shape and a measured characteristic of the natural object.

2. The apparatus of claim 1, comprising:
a pose estimator to estimate a pose of the natural object based on the expected shape;
a gradient generator to generate a disparity-based depth gradient and a homography-based depth gradient;
a gradient comparer to detect a difference between the disparity-based depth gradient and the homography-based depth gradient exceeds a predetermined threshold, wherein the parameter adjuster is to adjust a parameter to reduce the difference between the disparity-based depth gradient and the homography-based depth gradient below the predetermined threshold.

3. The apparatus of claim 2, comprising an edge segmenter to segment edges of the expected shape of the natural object.

4. The apparatus of claim 3, wherein the gradient generator is to generate the disparity-based depth gradient based on a disparity along segmented edges calculated between two stereo images.

5. The apparatus of claim 3, wherein the gradient generator is to generate the homography-based depth gradient using multi-view geometric projections to calculate a percentage change in depth along the segmented edges.

6. The apparatus of claim 1, wherein the parameter adjuster is to limit modifications of one or more depth camera parameters based on expected system changes.

7. The apparatus of claim 1, wherein the expected shape comprises a polygonal shape.

8. The apparatus of claim 1, wherein the expected shape comprises a planar geometric shape to be used to compute a homography.

9. The apparatus of claim 1, wherein the parameter comprises a parameter corresponding to alignment of the depth camera, wherein the depth camera comprises a stereo camera.

10. The apparatus of claim 1, wherein the apparatus comprises a node that provides a calibration service over a network.

11. A method for calibrating depth cameras, comprising:
receiving, via a processor, an image from a depth camera;
detecting, via the processor, a natural object with an expected shape in the image; and
adjusting, via the processor, a parameter to reduce a difference between the expected shape and a measured characteristic of the natural object.

12. The method of claim 11, comprising:
estimating, via the processor, a pose of the natural object based on the expected shape;
generating, via the processor, a disparity-based depth gradient and a homography-based depth gradient; and
detecting, via the processor, a difference between the disparity-based depth gradient and the homography-based depth gradient exceeds a predetermined threshold, wherein adjusting the parameter comprises adjusting to reduce the difference between the disparity-based depth gradient and the homography-based depth gradient below the predetermined threshold.

13. The method of claim 12, comprising segmenting, via the processor, edges of the expected shape of the natural object, wherein generating the disparity-based depth gradient comprises calculating a disparity along segmented edges between two stereo images comprising the image and converting the disparity to depth based on calibration parameters of the depth camera.

14. The method of claim 13, wherein generating the homography-based depth gradient comprises calculating a percentage change in depth along the segmented edges.

15. The method of claim 11, comprising limiting modifications of the parameter based on an expected system change.

16. The method of claim 11, comprising qualifying, via the processor, the natural object by comparing the estimated pose of the natural object to an expected pose for the natural object and disregarding natural objects with unnatural poses.

17. The method of claim 11, comprising applying, via the processor, a constraint that a detected edge of the natural object is straight.

18. The method of claim 11, comprising selecting a band on an image region at the boundary of the natural object and performing edge detection on the band.

19. The method of claim 11, comprising detecting, via the processor, the expected shape based on a template.

20. The method of claim 11, comprising computing a homograph based on the expected shape.

21. At least one non-transitory computer readable medium for calibrating depth cameras having instructions stored therein that, in response to being executed on a computing device, cause the computing device to:
receive an image from a depth camera;
detect a natural object with an expected shape in the image;
estimate a pose of the natural object based on the expected shape;
generate a disparity-based depth gradient and a homography-based depth gradient;
detect a difference between the disparity-based depth gradient and the homography-based depth gradient exceeds a predetermined threshold; and
adjust a parameter to reduce the difference between the disparity-based depth gradient and the homography-based depth gradient below the predetermined threshold.

22. The at least one non-transitory computer readable medium of claim 21, comprising instructions to segment edges of the expected shape of the natural object and generate the disparity-based depth gradient based on a disparity along segmented edges calculated between two stereo images.

23. The at least one non-transitory computer readable medium of claim 21, comprising instructions to generate the homography-based depth gradient using multi-view geometric projections to calculate a percentage change in depth along the segmented edges.

24. The at least one non-transitory computer readable medium of claim 21, comprising instructions to detect the natural object based on an object template.

25. The at least one non-transitory computer readable medium of claim 21, comprising instructions to limit modification of one or more depth camera parameters based on an expected system change.

* * * * *